United States Patent [19]

Mandrick

[11] 4,420,298

[45] Dec. 13, 1983

[54] DEVICE FOR MAKING SPATZELS

[76] Inventor: Ann Mandrick, 659 Perkins Dr., Warren, Ohio 44483

[21] Appl. No.: 288,298

[22] Filed: Jul. 30, 1981

[51] Int. Cl.³ .......................... A21C 3/04; A21C 11/16
[52] U.S. Cl. ...................................... 425/463; 426/500
[58] Field of Search .................. 425/463; 249/135; 241/95, 168, 273.1, 273.2, 273.4; 72/324, 325, 335; 30/278, 279 R; 426/496, 500; 99/353

[56] References Cited

U.S. PATENT DOCUMENTS

| 226,278 | 4/1880 | Chaumont | 241/273.1 |
|---|---|---|---|
| 820,915 | 5/1906 | Canfield | 241/95 |
| 853,725 | 5/1907 | Newton | 241/95 |
| 861,359 | 7/1907 | Dunlap | 241/95 |
| 1,428,703 | 9/1922 | Nicolussi | 241/168 |
| 1,566,706 | 12/1925 | Tanzi | 426/500 |
| 2,087,101 | 7/1937 | Cerracchio | 241/95 |
| 2,101,595 | 12/1937 | Potstada | 241/95 |
| 2,225,658 | 12/1940 | Rauchfuss | 241/95 |
| 3,297,042 | 1/1967 | Hutcheon | 72/324 |
| 3,559,445 | 2/1971 | Hougen | 72/325 |

FOREIGN PATENT DOCUMENTS 13803 of 1905 United Kingdom .................. 241/95

Primary Examiner—Willard E. Hoag
Attorney, Agent, or Firm—Harpman & Harpman

[57] ABSTRACT

A device for making large quantities of spatzels which are small elongated cylinders of dough extruded through a plurality of openings by hand. The extruded dough breaks off at a length dependent on the consistency of the dough used. The dough is then cooked in boiling water and can be used in many different types of ethnic dishes.

2 Claims, 3 Drawing Figures

DEVICE FOR MAKING SPATZELS

BACKGROUND OF THE INVENTION

1. Field of the Invention

This device relates to making spatzels, which is an ethnic name for small cylindrical-shaped pieces of dough that are placed in boiling water to cook to form an edible food product.

2. Description of the Prior Art

The closest prior art would be spaghetti making machines that extrude dough into long continuous strings that are cut into lengths and similar deivces for producing tubular pasta products.

SUMMARY OF THE INVENTION

A spatzle making device used to rapidly produce a large number of spatzles from dough. This device makes it unnecessary to roll out the dough by hand and break it off in small cylindrical shaped pieces which was necessary before. This device automatically imparts a quarter twist to the spatzel as it is formed by pushing the dough through a series of ragged edge openings within in a generally ovaloid shaped piece of material.

DESCRIPTION OF THE PREFERRED EMBODIMENT

Figure 1:
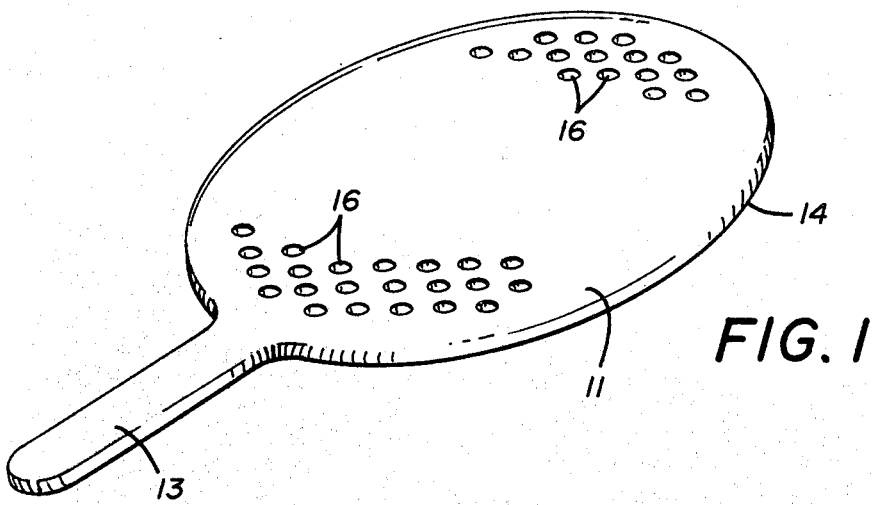
FIG. 1 is a perspective view of the spatzel maker.
Figure 2:
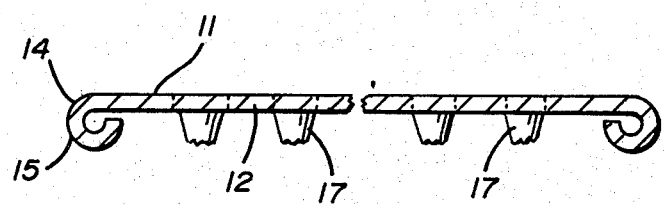
FIG. 2 is a cross section on lines 2—2 of FIG. 1.
Figure 3:
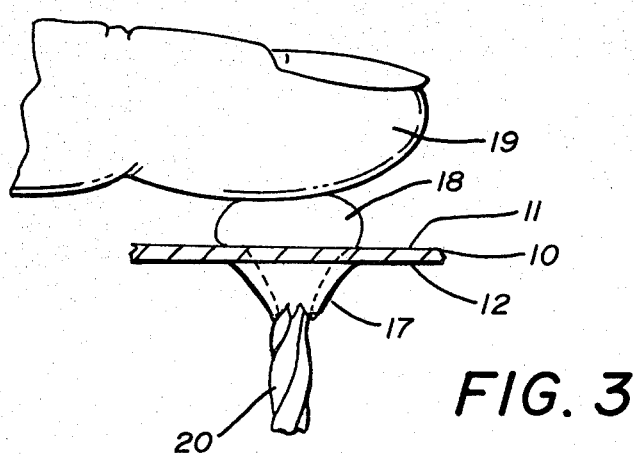
FIG. 3 is a side elevation with parts in section showing a spatzel being made.

A spatzel maker seen in FIGS. 1, 2 and 3 of the drawings, comprising an ovaloid shaped flat body member 10 preferably of metal having an upper and lower surface 11 and 12 respectively, with an elongated outwardly extending portion 13 defining a handle integrally formed thereon.

The ovaloid shaped flat member 10 has an edge configuration 14 comprising a downwardly and inturned flange 15 extending around the edge configuration 14 thereof.

Referring now to FIG. 2 of the drawings, the downwardly and inturned flange 15 can be seen as a 180 degree arcuate form terminating adjacent to and coplanar with the horizontal axis of the flat body 10. A plurality of spaced apertures 16 are formed in the upper surface 11 of the flat body member 10. Each of the apertures 16 is formed by punching the upper surface 11 downwardly with a tapered punch displacing the metal of the body 10 to define a shaped opening with a ragged edged tapered tubular extending member 17.

Referring now to FIG. 3 of the drawings, a portion of the flat body member 10 is shown with one of the apertures 16 therein. For illustration purposes, a quantity of dough 18 has been placed over one of the apertures 16 is pushed downwardly therethrough by the hand of the user represented at 19. Normally, a larger piece of dough covers several of the apertures 16.

In operation, the dough 18 is forced through the aperture 16 and formed into a solid cylindrical extending shape 20 rotating on its vertical axis as it leaves the member 17. The actual rotation of the dough is imparted thereto by the ragged edges of the member 17 providing the desired swirled pattern of hand-made spatzels. As the dough 18 extends away from the member 17, it stretches downwardly under its own weight due to the elastic properties inherent in the dough and breaks away from the preceding cylindrical shape at a desired length relative to its diameter and composition.

The newly formed spatzels are dropped directly into boiling water to be cooked for use in various types of ethnic prepared foods.

It will thus be seen that a new and useful device for the rapid production of spatzels has been illustrated and described, and that the device eliminates the time consuming hand forming process currently used to form spatzels greatly increasing the ability of an individual to produce a large number of spatzels within a given time.

The dough referred to is usually made of wheat flour, water and eggs.

It will be understood by those skilled in the art that various changes and modifications may be made herein without departing from the spirit of the invention and having thus described my invention what I claim is:

1. A spatzel making device comprising a thin, flat metal body member having a plurality of spaced apertures punched therein of sufficient size for forming spatzed therethrough, depending tubular members formed on said body member from the metal displaced from said punched apertures and extending from the metal around said apertures, each tubular member defining a slightly tapered passageway terminated in irregular, angular, twisted configurations by said displaced metal, the edges of said tubular members having circumferentially irregular patterns arranged so that dough pushed therethrough will rotate about its axis and conform with the shaped angular configuration of the ends of the tubular members, a handle formed on said body member extending outwardly therefrom.

2. The spatzel making device set forth in claim 1 and wherein said thin, flat metal body member has a peripheral flange arranged to impart rigidity to said body member.

* * * * *